(12) United States Patent
Vandeputte

(10) Patent No.: US 7,014,132 B2
(45) Date of Patent: Mar. 21, 2006

(54) METHOD AND PLANT FOR SEPARATING POLYMERIC MATERIALS

(76) Inventor: Antoine Vandeputte, 131 Voskenstrant, Menen (BE)

( * ) Notice: Subject to any disclaimer, the term of this patent is extended or adjusted under 35 U.S.C. 154(b) by 417 days.

(21) Appl. No.: 10/424,962

(22) Filed: Apr. 28, 2003

(65) Prior Publication Data

US 2004/0035757 A1 Feb. 26, 2004

Related U.S. Application Data

(63) Continuation of application No. 09/230,258, filed on May 17, 1999, now abandoned.

(30) Foreign Application Priority Data

| Jul. 22, 1996 | (FR) | ............................................. 96.09485 |
| Jul. 22, 1996 | (FR) | ............................................. 96.09486 |

(51) Int. Cl.
*B02C 19/12* (2006.01)

(52) U.S. Cl. .......................... 241/20; 209/3; 241/24.18; 241/24.28; 241/23

(58) Field of Classification Search .............. 241/24.12, 241/24.18, 24.28, 23, 20; 209/3, 12.1, 17, 209/173

See application file for complete search history.

(56) References Cited

U.S. PATENT DOCUMENTS

| 3,715,083 A | 2/1973 | Funk ........................ 241/24.1 |
| 3,925,200 A | 12/1975 | Izumi et al. ................... 209/9 |
| 4,073,661 A | 2/1978 | Buzga et al. ................. 241/20 |
| 4,077,847 A | 3/1978 | Choi et al. .................... 201/21 |
| 4,079,837 A | 3/1978 | Grube et al. ................. 209/17 |
| 4,251,034 A | 2/1981 | Corr et al. .................... 241/14 |
| 4,379,525 A | 4/1983 | Nowicki et al. ............. 241/20 |
| 4,406,411 A | 9/1983 | Gall et al. ................... 428/577 |
| 4,578,184 A | 3/1986 | Rasmussen .................... 209/3 |
| 4,610,396 A | 9/1986 | Carbonell Serra et al. .... 241/19 |
| 4,728,045 A | 3/1988 | Tomaszek .................... 241/19 |
| 4,809,854 A | 3/1989 | Tomaszek ..................... 209/3 |
| 4,830,188 A | 5/1989 | Hannigan et al. ............. 209/3 |
| 4,844,351 A | 7/1989 | Holloway .................... 241/14 |

(Continued)

FOREIGN PATENT DOCUMENTS

| AU | 363051 | 7/1981 |
| DE | 4329270 A1 | 8/1994 |
| EP | 568710 A1 | 11/1993 |
| FR | 2281166 | 3/1976 |
| FR | 2310160 | 12/1976 |
| FR | 2341419 | 9/1977 |
| FR | 2599279 | 12/1987 |
| RU | 906716 | 2/1982 |
| RU | 1055041 | 10/1993 |
| WO | WO 92/22380 | 12/1992 |

OTHER PUBLICATIONS

Wiederaufbereitungsanglage Fur PVC–Folien, von Dr. Gunteher Dreiinger and Dipl.–Ing, "Kunststoirater", Jun. 1993, No. 6, Isernhagen, Germany—pp. 26–31.

Patent Abstract/Derwent: of Japanese Patent 740104668, pub. Date Mar. 1976; Mitsui Metal Mining.

*Primary Examiner*—Mark Rosenbaum
(74) *Attorney, Agent, or Firm*—McCarter & English, L.L.P.

(57) ABSTRACT

A method for recycling polymeric materials, including a mechanical separation step (B), a first density separation step (C), an intensive cleaning step (E), and a second density separation step (G, V) is described. Additional separation steps, such as a third density separation step (M, W), and optionally a fourth density separation step ($G_a$, $G_b$). Further less essential steps such as wetting (A), grinding (D), air flow separation (K), drying (I), electrostatic sorting (Z) and optional sorting ($Z_a$) steps may also be carried out to achieve optimized and refined separation. Polymeric materials from refuse or crushed motor vehicles may thus be separated, and polyethylene, polypropylene, polystyrene and acrylonitrile-butadiene-styrene resins may be recycled.

42 Claims, 5 Drawing Sheets

U.S. PATENT DOCUMENTS

| | | | |
|---|---|---|---|
| 4,849,116 A | 7/1989 | Weinmann et al. | 210/770 |
| 5,042,725 A | 8/1991 | Grimmer | 241/19 |
| 5,133,505 A | 7/1992 | Borcier et al. | 241/19 |
| 5,143,308 A | 9/1992 | Hally et al. | 241/76 |
| 5,168,727 A | 12/1992 | Snellink et al. | 62/532 |
| 5,183,212 A | 2/1993 | Boo et al. | 241/17 |
| 5,246,116 A | 9/1993 | Kirk | 209/3 |
| 5,248,041 A | 9/1993 | Deiringer et al. | 209/166 |
| 5,255,859 A | 10/1993 | Peacock et al. | 241/79.1 |
| 5,268,074 A | 12/1993 | Brooks et al. | 162/4 |
| 5,277,758 A | 1/1994 | Brooks et al. | 162/4 |
| 5,280,837 A | 1/1994 | Beliveau | 209/466 |
| 5,295,582 A | 3/1994 | Dan | 209/3 |
| 5,323,971 A | 6/1994 | Nishibori et al. | 241/3 |
| 5,341,935 A | 8/1994 | Djerf et al. | 209/3 |
| 5,358,119 A | 10/1994 | Stahl et al. | 209/3.1 |
| 5,375,778 A | 12/1994 | Lundquist | 241/20 |
| 5,390,860 A | 2/1995 | Ali et al. | 241/20 |
| 5,397,066 A | 3/1995 | Leitman et al. | 241/19 |
| 5,443,157 A | 8/1995 | Baker et al. | 209/12.1 |
| 5,566,889 A | 10/1996 | Preiss | 241/19 |
| 5,609,256 A | 3/1997 | Mankosa | 209/5 |
| 5,630,553 A | 5/1997 | Serban et al. | 241/23 |
| 5,653,867 A | 8/1997 | Jody et al. | 209/164 |
| 5,667,151 A | 9/1997 | Miura et al. | 241/20 |
| 5,740,918 A | 4/1998 | Hayashi et al. | 209/173 |
| 5,785,259 A | 7/1998 | Nishibori | 241/24.18 |
| 5,887,805 A | 3/1999 | Chapman | 241/24.13 |
| 5,894,996 A | 4/1999 | Williams | 241/20 |
| 5,957,295 A | 9/1999 | Neureither | 209/3 |
| 5,961,054 A | 10/1999 | Nishibori | 241/19 |
| 5,976,435 A | 11/1999 | Djerf et al. | 254/112 |
| 5,988,395 A | 11/1999 | Calo et al. | 209/3 |
| 6,007,005 A | 12/1999 | Gonzales et al. | 241/20 |
| 6,024,226 A | 2/2000 | Olivier | 209/172.5 |
| 6,095,441 A | 8/2000 | Unkelbach et al. | 241/20 |
| 6,114,401 A | 9/2000 | Doonan | 521/40 |
| 6,131,741 A | 10/2000 | Hagen | 209/9 |
| 6,138,929 A | 10/2000 | Montgomery | 241/20 |
| 6,149,811 A | 11/2000 | Hodges et al. | 210/328 |
| 6,168,642 B1 | 1/2001 | Valkanas et al. | 71/9 |
| 6,213,306 B1 | 4/2001 | Fiedlschuster et al. | 209/3 |
| 6,216,967 B1 | 4/2001 | Hoberg et al. | 241/20 |

METHOD AND PLANT FOR SEPARATING POLYMERIC MATERIALS

PRIOR APPLICATIONS

This application is a continuation of U.S. application Ser. No. 09/230,258 filed on May 17, 1999, abandoned which is incorporated by reference herein and claims priority to PCT application PCT/FR97/01355 filed on Jul. 22, 1997 and which amended on Aug. 26, 1998, which claims priority to French Application Ser. No. 96/09486 filed on Jul. 22, 1996 and French Application Ser. No. 96/09485 filed on Jul. 22, 1996.

FIELD OF THE INVENTION

The present invention relates to a method for separating polymer materials originating from waste.

The invention also relates to a plant intended to carry out the method for separating polymer materials.

BACKGROUND OF THE INVENTION

The recycling industry engages in the selective recovery of polymer materials, for example such as polyethylene (PE), polypropylene (PP), acrylonitrile-butadiene-styrene (ABS), polystyrene (PS), polyvinyl chloride (PVC), polyurethanes (PU) and others. The present invention relates to methods and a corresponding plant which ensure the upgrading of spent polymer materials originating from all types of wastes, and more particularly from motor vehicles. It is hence a matter of achieving a very selective separation of mixtures of polymer materials according to their components, and also the conversion thereof into materials, which can be reused or reintroduced into a new cycle of manufacture.

The sorting of polymer materials can be achieved in several ways, such as by manual sorting, sorting after cryogenic grinding, sorting with electrostatic processes, sorting by infrared analysis or by laser radiation, density sorting, and sorting according to color and shapes. Interest is shown more particularly here in the sorting of large amounts of polymer materials of different natures.

A plant for recycling polymer materials is described in DE-A-4,329,270, and comprises, in particular, a grinder, a discharge basin for removing the heaviest materials, an air-flow separator for separating the polymers in the form of sheets, and then density separators. In the discharge basin, polymer materials with a density greater than 1 g/cm$^3$ can be removed, however, there is no cleaning apparatus for polymer materials. The inclusion of a cleaning apparatus proves to be essential in the case of wastes originating from public garbage dumps or from motor vehicle breakers.

US-A4,728,045 describes a method for recovering synthetic materials originating from bottles of polymer materials. A grinding step, an air-flow separation in order to remove light materials such as paper and PP in film form, two flotation separations in medium of a specific density in order to separate the PE from the polyethylene-terephthalate (PET), and a further aerodynamic separation are successively performed. This method is applicable only to bottles of polymer materials and other scrap articles whose polymer composition is precisely known at the beginning of the reclaiming process.

A method for separating polymer materials originating from containers is described in WO-A-92/22,380. This method comprises a grinding step, an airflow separation step, a material cleaning step, and several density separation steps. This method is applicable only to one type of starting substrate whose polymer composition is precisely known.

Document Kunststoffberater, 38, June 1993, No. 6, pages 26 to 30, describes a plant comprising a grinder, a washer and density separators. The washer has a rotating-drum device. However, the starting substrate contains from 95 to 100% PVC and from 0 to 5% of impurities. This plant is only designed for the separation of PVCs.

Document Kunststoffe 80, April 1990, No. 4, pages 493 to 495, describes a plant for separating polymer materials generally like that described above, comprising a grinder, a cleaning device in the form of a rotating drum with nozzles, and density separators.

A process for separating polymer materials is described in FR-A-2,599,279. After grinding and washing, there is a centrifugation in a hydrocyclone, then sorting with a shaking screen.

AT-363,051 describes a process for recovering synthetic materials, which consists of a grinding step, a first flotation step, washing and a further grinding step, followed directly by a second flotation operation. These methods give insufficient results in terms of quality of the polymer materials obtained after separation.

None of these cited methods give satisfactory results in separating polymer materials from waste streams. They are slow or require a very large initial investment. They are also inapplicable to sorting at high rate and therefore cannot be adapted to industrial scale.

Thus, it appears that no separation process of the prior art can be used for sorting mixtures of a wide variety of polymer materials originating from the grinding of motor vehicles or from other sources of wastes.

SUMMARY OF THE INVENTION

The present invention provides methods and a corresponding plant for separating complex mixtures of polymer materials of all types, which are effective on an industrial scale and which gives a degree of purity of the polymer materials close to the degree of purity of the polymer materials of the initial melt.

One object of the invention is to overcome the lack of efficacy of existing techniques, by using and appropriately placing a new additional mechanical separation phase in a sequence of cleaning and density separation steps.

According to the invention, the method for separating polymer materials originating from waste comprises a grinding step and is characterized by the following four steps, which can be carried out in any order: a form-factor mechanical separation step, a cleaning step, and at least two density separation steps.

These four main steps can be organized in up to 24 different ways. It is possible to start with a form-factor mechanical separation step, followed, in any order, by the other steps envisaged. Alternatively, the method can also start with a density separation step, followed, in any order, by the other steps envisaged. The order of the steps is selected based upon the polymer materials that it is desired to separate and recover at the end of the process.

Other advantages of the method and of the plant according to the invention will become apparent on reading the detailed embodiment of the invention, with reference to the drawings given for illustrative purposes, in which:

DETAILED DESCRIPTION OF THE INVENTION

Figure 1:
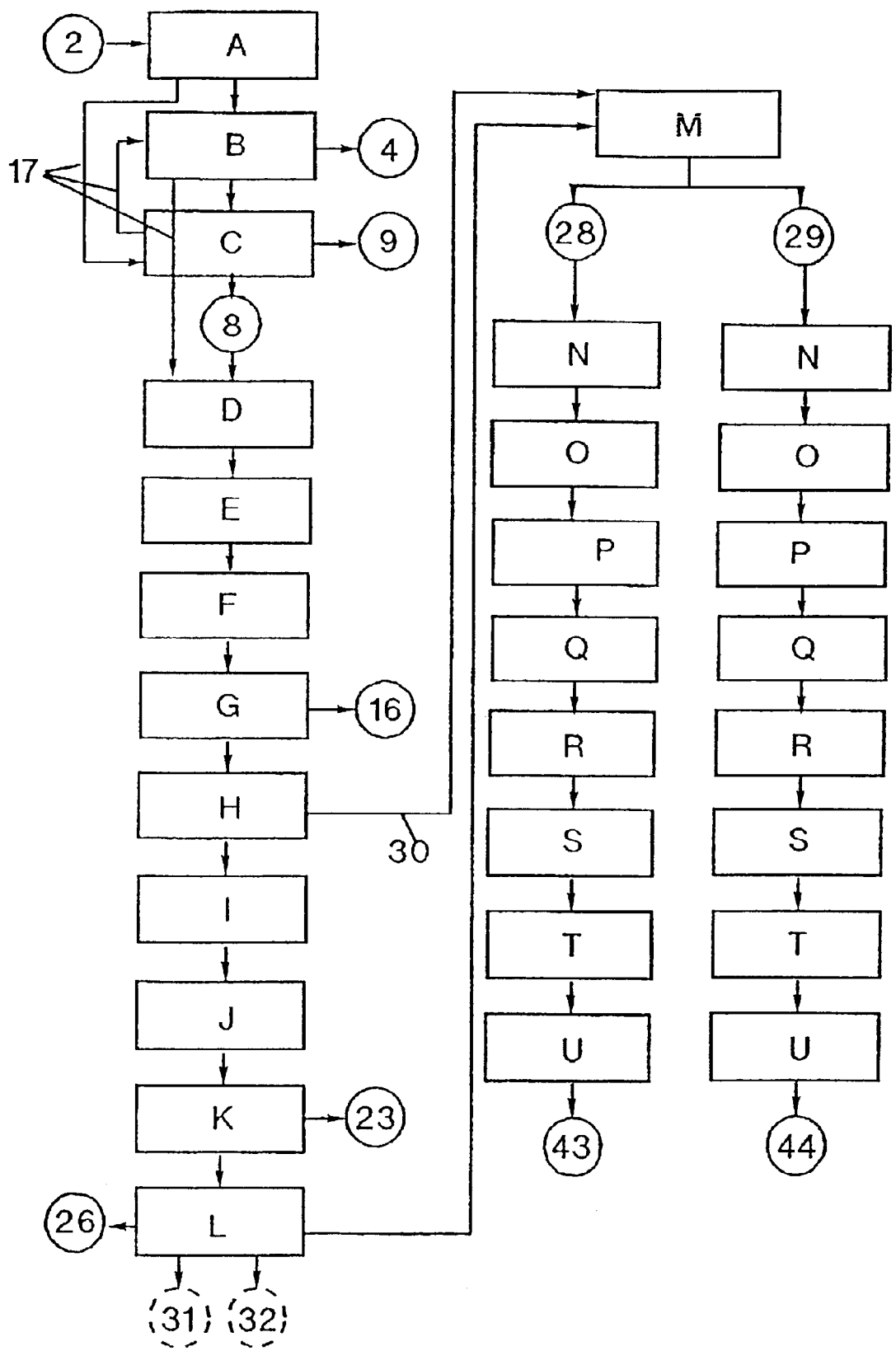
FIG. 1 is a flow chart of the method of the invention, comprising a first and a second part corresponding, respectively, to a first and to a second part of the plant.
Figure 2:
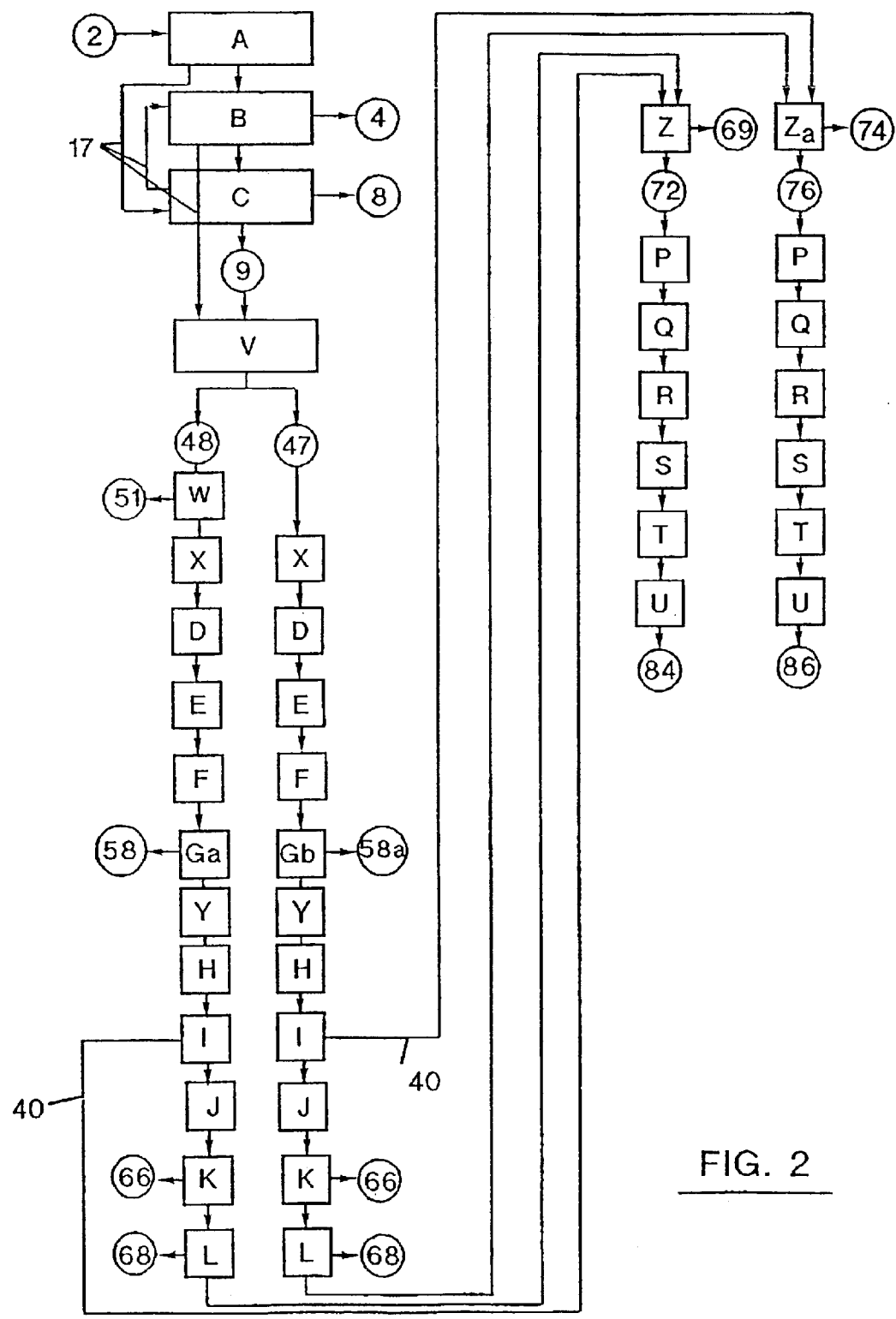
FIG. 2 is a flow chart of the method of the invention, comprising a first and a third part corresponding, respectively, to a first and to a third part of the plant.
Figure 3:
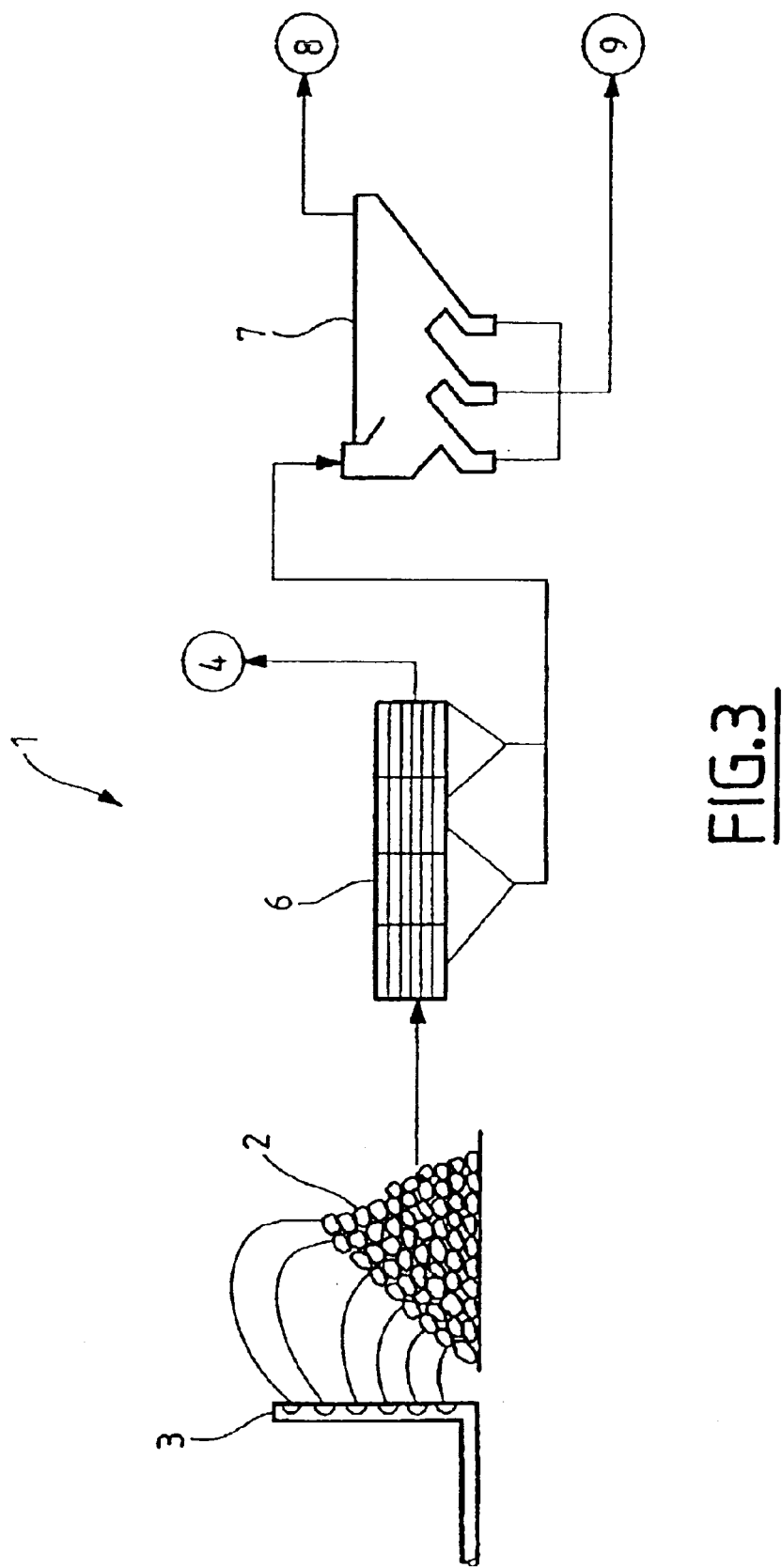
FIG. 3 shows a first part of the plant carrying out the method of the invention.

The present invention is directed to methods for separating recyclable polymer materials from ground waste streams. Preferred embodiments of the invention are described below in conjunction with the drawings provided herein. The preferred embodiments disclosed herein are to be considered exemplary of the principles of the present invention and are not intended to limit the invention to the embodiments described or illustrated. Various modifications will be apparent to those skilled in the art without departing from the spirit or scope of the invention disclosed herein.

Preferably, a mechanical separation step is followed by a first density separation step, then a step of cleaning polymer materials and a second density separation step. A mechanical separation step followed by a first density separation step, then a second density separation step and a step of cleaning polymer materials is also proposed. Alternatively, a mechanical separation step is followed by a step of cleaning polymer materials, then a first density separation step and a second density separation step. In another embodiment, a first density separation step is followed by a mechanical separation step, then a step of cleaning polymer materials and a second density separation step. In yet another embodiment, a first density separation step is followed by a mechanical separation step, then a second density separation step and a step of cleaning polymer materials. In yet another embodiment, a first density separation step is followed by a step of cleaning polymer materials, then a mechanical separation and a second density separation.

The mechanical separation step is achieved in particular with screening means comprising a calibrated grid, which allows the removal of all materials that are too large in size.

All density separation steps are preferably are performed by flotation in a liquid medium. The mixed polymer materials are immersed in a bath. The bath density is checked and controlled, which allows separation of materials that will float, having a density less than that of the liquid medium, from materials that will sink, having a density greater than that of the liquid medium. The materials of interest are recovered and then subjected to further treatments. The density separations can also be achieved with a mechanical device comprising a densimetric table.

The step of cleaning polymer materials allows them to regain a surface similar to the surface of the materials in the initial polymer melt, i.e. a surface free of damaged layers, paint, grease, etc. The cleaning is achieved in a liquid medium, preferably with vigorous stirring, at elevated temperature, in a liquid medium of precise compositions.

In the method, the separation steps allow the separation of, on the first hand, polymer materials having a density of less than 1 $g/cm^3$, in particular polyolefins, and more particularly PP and PE, and, on the other hand, polymer materials having a density of greater than 1 $g/cm^3$, in particular styrenes, and more particularly PS and ABSs.

In order to further refine the separation, to remove the maximum amount of impurities of all sizes and of all materials, and to obtain an optimized method, other additional purification steps can be performed between the main steps. For example, a wetting step, a further grinding step, an air-flow separation step to remove the lightest particles, an electrostatic sorting step, an optical sorting step, a step of density separation with a mechanical device, a rinsing and dripping step, a centrifugation step to remove any liquid, a drying step and a step of storage in a silo may be appropriately performed among the four main steps described above.

In order to obtain separated materials of better quality and to improve their respective mechanical properties, the polymer materials can be centrifuged and dried, if the polymers are wet, then the polymer materials can be homogenized, extruded, centrifuged, calibrated and homogenized again, and the purified polymer materials obtained are finally bagged.

With the method of the present invention, the precise sequence of each of the separation steps makes it possible to obtain highly purified polymer materials at the end of the method.

According to a second aspect of the invention, a plant is characterized in that it preferably includes the devices for grinding, for density separation with flotation, for mechanical separation, for electrostatic separation, for separation by optical sorting, for air-flow separation, for cleaning, for density separation with a mechanical device, for wetting, for rinsing and dripping, for centrifugation, for drying, for homogenization, for storage, for extrusion, for calibration and for bagging. These devices follow each other in the plant in the preferred order given by the separation method, with the preceding devices feeding the following devices.

For recycling materials from a car, a truck or a bus, the fluids are removed and the vehicle is crushed and then ground. All the free pieces of metal are separated from the non-metallic parts by usual techniques known to those skilled in the art. The inorganic materials, glass and soil are removed by screening. A large deposit 2 of polymer materials with a density, for example, of less than 1.25 $g/cm^3$ is then recovered. These polymer materials are ground to between 8 mm and 100 mm, preferably to about 25 mm. If necessary, grinding to 25 mm is repeated, and a pre-selection operation is repeated in order to remove everything which has a density of greater than 1.25 $g/cm^3$.

It is at this stage that the steps of the method of the present invention for recycling the polymer materials begin. Pieces of wood, of soil adhering to the polymer materials, tars, paper, etc. remain. Throughout the plant 1 which will be described below, conveyor belts, screw systems and pneumatic carriers, represented solely in the form of black-headed arrows, allow continuous and high-speed transportation of the materials from one device to the next. All the steps from A to Z and their corresponding devices operate continuously, or also by batches according to the respective flow rate of each of the devices. The sequence of steps given below has given particularly advantageous results.

Firstly, in a first part of the plant 1, wood present among the polymer material is densified, so as to give it a density of greater than 1 $g/cm^3$, in order subsequently to remove it by a separation according to the criterion of density. For this, a wetting operation A is performed by a device 3 which sprays water onto the piles of waste 2. This can also be performed by immersing the wastes in liquid or alternatively by a mechanical defibration of the wood, by trituration, for example, using a turbomixer. An alkaline solution based on KOH or NaOH can be used for the soaking, the aim being to start a hydrolysis of the cellulose fibres of the wood. The purpose is to destroy this material in order to give it a density of greater than 1 g/cm$^3$.

The parts 4, such as foams, alveolar PUs, alveolar rubbers, textiles, threads, expanded PSs, film wastes of polymer materials, and wood, are then removed by a mechanical selection B. This operation is a form-factor separation. A screening device allows this sorting to be performed. It comprises, for example, a rotating drum 6 having a calibrated grid with a mesh size of 10 mm in width by 25 cm in length, for example. Everything which does not have a plate shape with dimensions within the mesh size, and thus everything which has not been correctly shredded during a preceding grinding, is retained for removal. The treatment is continued with all materials that pass through this sorter 6.

A first density separation operation C with flotation is achieved in a hydraulic separator 7. The density chosen is more or less equal to 1 g/cm$^3$, the flotation medium being water.

The floating materials 8 and the polymers not filled with minerals, with density less than or equal to 1 g/cm$^3$, are recovered and treated in a second part of the plant 1 which will be described below. These polymers are, in particular:

PE (density of 0.92 g/cm$^3$ to 0.95 g/cm$^3$),

PP (density of 0.9 g/cm$^3$), ethylene-vinyl acetate EVA;

ethylene-propylene, propylene-ethylene-propylene rubber, ethylene-propylene-diene monomer EPDM copolymers;

PE foams, PP foams; and

PU foams (density of 0.02 g/cm$^3$ to 0.035 g/cm$^3$).

All the non-expanded polymers and materials 9 with a density of greater than 1 g/cm$^3$ are directed into and treated in a third part of the plant 1 which will be described last. These materials are, in particular:

unfilled PS (density of 1.05 g/cm$^3$);

unfilled ABS (density of 1.07 g/cm3);

PVC;

polycarbonates (PC);

rubbers, except thermosetting alveolar rubbers;

filled polyolefins with density greater than 1 g/cm3, PP filled with 20% talc (density of 1.05 g/cm3);

filled PUs (density of 1.21 g/cm3);

filled PE;

unsaturated polyesters (density of 1.10 g/cm3 to 1.3 g/cm3);

saturated polyesters (density greater than or equal to 1.2 g/cm$^3$), whether or not filled with glass fibres;

polyamides, $PA_6$ (density of 1.13 g/cm$^3$), $PA_{6,6}$ (density of 1.14 g/cm$^3$); $PA_{6,10}$ (density of 1.08 g/cm$^3$), $PA_{11}$ (density of 1.04 g/cm$^3$), $PA_{12}$ (density of 1.02 g/cm$^3$) whether or not filled;

poly(methyl methacrylate) PMMA (density of 1.18 g/cm$^3$).

The supernatant is treated in the second part of the plant 1, also comprising unwanted materials such as wood, foams, fabrics, fibres and textiles.

The floating materials are then directed into a grinder 11 for a reduction step D. The grids have a size from 8 to 100 mm with an optimum of 12 mm. The first object of the previous operations B and C is to avoid grinding unwanted material, for example nails, stones, etc., and the second object is to achieve energy savings by reducing the amount of material to be ground.

A wetting step identical to the wetting step A and to its variants described above can also be performed after this grinding. The wetting step A must precede a hydraulic separation as closely as possible.

An intense cleaning step E takes place at this stage. This operation is fundamental since it allows the polymer materials in substrate form to regain their native surface. In fact, the polymer materials are very often soiled with tars, soil, lead residues, oils, coolant fluid, acid, gazole and gasoline. Furthermore, the surfaces of the polymer materials can be either covered with paint (in the case of PP bumpers), or etched with chemical agents, or oxidized, or degraded by UV rays or alternatively aged. All of these factors modify the surface and do not allow full efficacy of the subsequent flotation separations. The cleaning treatment is necessary if it is desired that the polymer materials obtained at the end of separation have the same physicochemical properties as native polymer materials. Accordingly, the pieces are introduced into one or more washing and triturating machines 12. The latter comprise, for example, one or more fixed tanks, rotating paddles and powerful motor means which can develop 0.05 to 0.5 kWh per kg of material to be treated, for example such as the device sold under the trade name Wemco®. A liquid medium composed of water, a cleaning agent and optionally an abrasive agent is added in the tanks. The washing operation E is performed in a medium which is as concentrated as possible, at room temperature or, better still, hot, it being possible for the water to be brought to boiling by means of the heat dissipated by the motors.

The composition of the materials in the cleaning device can be:

a mixture of polymer materials from 50 to 70% by weight;

a liquid phase from 30 to 50% by weight comprising:

from 50 to 100% by weight of water, from 0 to 20% by weight of a cleaning agent, such as for example sodium hydroxide, potassium hydroxide, sodium carbonate, non-foaming biodegradable soaps of trade name Akypo MB 2621 S® supplied by the Chemy Company, a wetting agent (based on fatty alcohols modified with ethylene oxide and/or propylene oxide), and from 0 to 30% by weight of abrasive agent, such as for example minerals such as calcium carbonate powder, talc, silica or alumina.

At the outlet, the polymer materials are rinsed with water and drained during step F, for example in the extraction screw 13. The water recovered can be re-injected into the washing machine 12 if desired.

A second step of density separation with flotation G in a separator 14 then takes place. This is performed in a liquid medium with a density more or less equal to 1 g/cm$^3$, the liquid being water. The material which sinks 16, with a density of greater than 1 g/cm$^3$, is removed. This sorting makes it possible to improve the selection already started during the first flotation separation C. Because the surfaces of the polymer materials were cleaned during step E, additional materials will sink 16, which may have had artifacts which gave them false densities of less than 1 g/cm$^3$. Accordingly, a finer density sorting operation can be achieved at this stage. The various types of polymer materials are separated by this process, if the density of the liquid medium is precisely controlled. There is also removal by sinking of materials 16 such as residual sands stuck beforehand to the PE and to the PP, and especially most of the wood. The wood has been extensively eroded, disintegrated and soaked with liquid during the previous trituration step, thus giving it a density of greater than 1 g/cm$^3$.

The sorting device 6 of the step B can also be placed at other places in the upgrading line, for example after the flotation step C (arrows 17 showing the sequence A, C, B, D).

Next, a rinsing and a centrifugation H in a centrifuge 18, is performed to remove the remaining liquid, are performed for the supernatant polymer materials.

A continuous drying step I is then performed. This operation can be achieved using various apparatuses. For example, a fluidized bed dryer 19, a flash dryer, a drying in a Wemco® type triturator, in which the temperature increase is obtained by means of the mechanical stirring energy, or a Voom® type counter-current dryer can be used.

The resulting mass is stored J in a buffer silo 21, which is useful if the line breaks down or in the event the line stops for servicing and maintenance.

An optional air flow separation step K may be performed at this stage. The air flow separation must be placed after the drying step I. The separator 22 allows the removal of all light materials 23, such as dusts remaining adhered, small fibres and foams, as well as the remaining fine particles of wood.

A mechanical density sorting step L can enhance the separation of the materials. It is preferably performed in a mechanical device 24 such as a densimetric shaking table, which can be obtained, for example, from the Herbold Company (Germany) or from the Eldan Company (Denmark). All the remaining circulating light materials 26, wood, foams, rubber and impurities are removed in this step.

A final density separation step M is placed in the final sorting phase, to separate two particularly advantageous and high-value materials among the materials having densities less than 1 g/cm$^3$: these are the two polyolefins, PE and PP. Preferably, a flotation M, similar to the flotation G, is performed. The density of PP is 0.9 g/cm$^3$ and the density of PE is from 0.92 g/cm$^3$ to 0.95 g/cm$^3$. The separation takes place in a separator 27 in liquid medium of a very precisely controlled density and, in fact, between 0.9 and 0.95. The liquid medium preferably comprises water and an alcohol chosen from methanol, ethanol, a wine alcohol, a denatured alcohol or methylated alcohol. The temperature of the water-alcohol mixture used is in the range 55° to 60°. The monitoring of the density of the medium is performed using an alcohol gauge. Adjustment of the fraction of alcohol makes it possible to optimize the medium density in order to obtain a separation as selective as possible. The intensive washing G which was previously performed allows optimal contact between the native surface of the polymer materials to be treated and the medium of chosen density. A wetting agent is also added to the medium, in a proportion from 0.1% to 0.2% by weight. The presence of this wetting agent substantially improves the separation. Antarox-FM3® from the Rhône-Poulenc Company is preferably used. The advantage of the preceding steps of centrifugation H and of drying I, prevents modification of the finely adjusted density of the liquid medium in the separator 27 by an interfering addition of water from the cleaning step. The PP-PE mixture introduced is almost fully separated. The supernatant material 28, recovered at the top, is composed of PP and the sinking material 29, recovered in the bottom part, is composed of PE.

The process can be stopped at this step J and the materials stored in a silo 21, if it is desired to sell only the polyolefins. It should be noted that step M can be placed directly after the centrifugation step H when the wastes are free of light products; if steps I to L are not performed, step H is followed by step M, according to the arrow 30.

Step M can be omitted. The mechanical density sorting step L with a vibrating table 24 can serve to separate the two above-mentioned polymer materials PE and PP, according to their intrinsic density. The method can thus be completed at this stage by obtaining pure PE and PP, 31 and 32 respectively.

The PP 28, 32 and the PE 29, 31 sorted by means of this plant can either be sold for direct use, or can immediately undergo further treatment steps N to U. In particular, an extrusion is achieved which makes it possible to obtain, for the polymer materials thus treated, mechanical properties which are almost identical to those of the native polymer materials.

Figure 4:
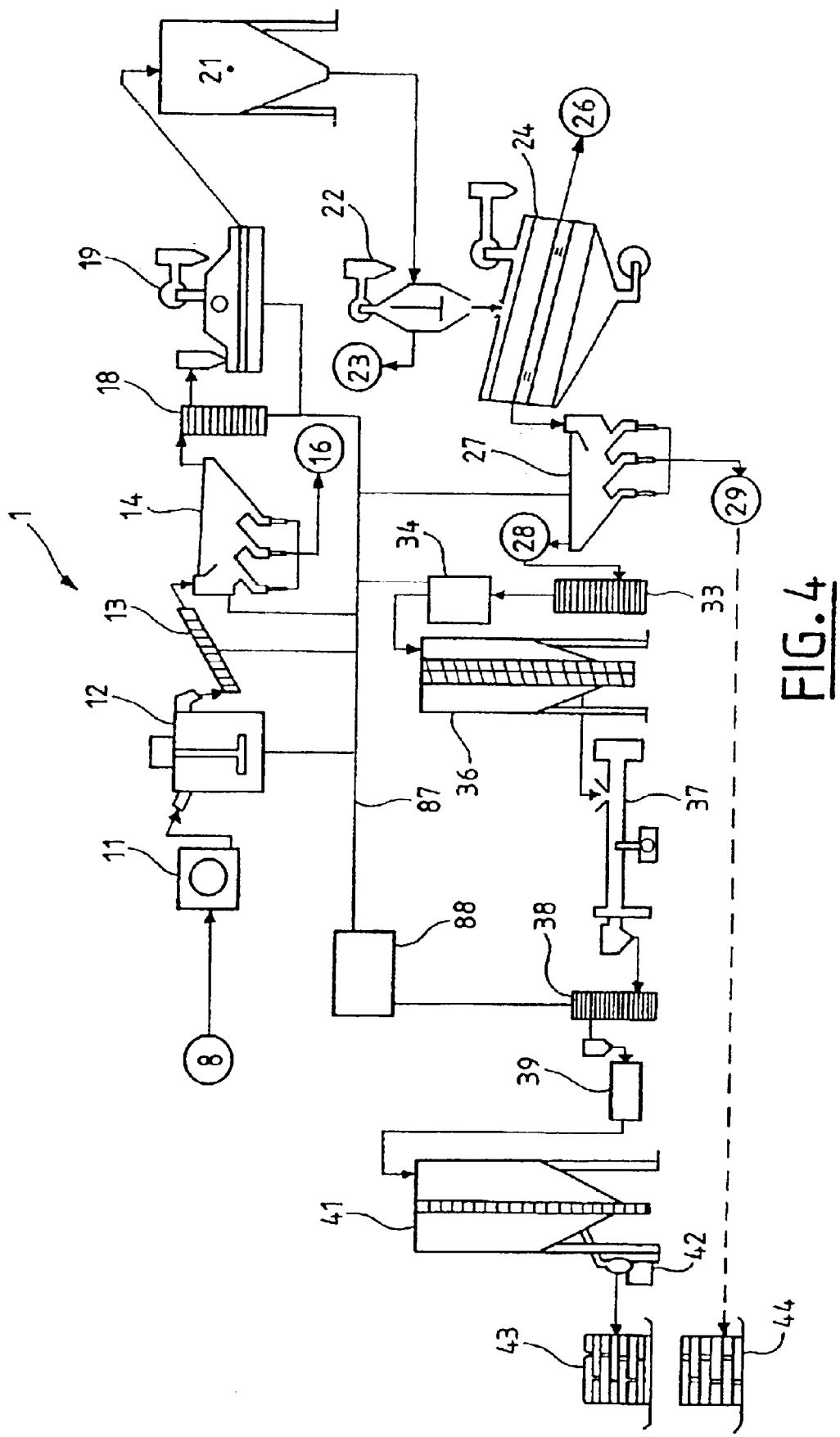
FIG. 4 shows a second part of the plant carrying out the method of the invention, more particularly intended to separate polymer materials with a density of less than 1 $g/cm^3$.

At this stage, FIG. 4 represents only the plant required for the treatment of a single material, PP 28, it being understood that the other material, PE 29, is treated in the same way, by following the same steps from N to U carried out with the same devices (represented with dashed lines in FIG. 4).

The PP phases 28, 32 and PE phases 29, 31 are thus separately centrifuged N in a centrifuge 33, in order to bring the amount of liquid to about 1% to 2%. They are dried O in a dryer 34, for example one which is identical to the dryer used in step I.

They are homogenized P by circulation in a silo 36 which also serves for storage of the materials.

The materials are extruded Q in an extruder 37 to produce pellets. There is also an in-process filtration of 20 to 300 μm in order to remove the last impurities. This is a test, to determine whether or not the product to be extruded is pure. Various agents can also be introduced to the material, such as dyes, anti-UV agents, etc. An air-flow separation step can optionally be placed between storage step P and extrusion step Q, in order to remove fibres and dusts (not represented).

The PE and PP phases are centrifuged R in a centrifuge 38 in order to remove the cooling water from the pellets.

The PE and PP phases exiting in the form of pellets are graded S in a grader 39 in order to remove the fines and aggregates.

The pellets are re-homogenized T in a homogenization and storage silo 41. In the final step U, they are placed in bags of about 50 l in a bagging machine 42.

The PP 43 and PE 44 exit as finished products of excellent quality, and can be used in the usual applications of these polyolefins.

In a third part of the plant 1, the polymers with a density of greater than 1 g/cm$^3$, to be recovered from, for example, motor vehicle crushing residues, include styrenes, and more particularly PS and ABS. Other wastes are also found among these materials, such as stones, nails, etc.

From the separator 7, the sinking materials 9 are passed, by a density separation operation V, with flotation into a hydraulic separator 46. The density in the hydraulic separator is about 1.05 g/cm$^3$. The PS 47 floats, as do polypropylenes filled with talc to 10–20%, wood and fibres. The ABS 48 flows, but so do poly(methyl methacrylate), other polymers, wood, dense foams and all materials up to a density of 1.25 g/cm$^3$. The liquid medium in the hydraulic separator contains water, wetting agents and inorganic compounds such as clays, bentonite, or soluble compounds such as salts, etc., compounds used to increase the density of water. Quarry clay is preferably used. This clay is suspended in water and the heaviest particles, which accumulate at the bottom of the container, are removed in order to obtain a homogeneous medium. The density is then controlled by adding water. The role of the wetting agent is also to keep the clay in suspension. The agent used is Coatex SP 30 S®.

The ABS purifying line 48 will be now described. The ABS and the sinking material 48 are conveyed to a third flotation operation W in a hydraulic separator 49. This takes place in a liquid medium with a density of about 1.1 g/cm$^3$. The liquid has a similar composition to the composition described for the medium in the separator 46 of step V, except that the amount of clays per unit Volume is greater. The material which sinks 51 comprises stones, soil, and 30–40% filled polypropylenes. At this density, the ABS floats, but so does the wood.

Next, floating ABS is rinsed X by spraying it in the transport screw 52, and is drained and centrifuged in order to completely remove the adhering clay therefrom.

The ABS is then directed into a grinder 53 for a reduction step D, which is identical to the grinding D already described. The grids are from 8 to 100 mm, in size, and are preferably 12 mm. An object of the preceding flotation operation W is to avoid grinding unwanted material, for example nails, stones, etc., and a second object is to achieve energy savings by reducing the amount of material to be ground.

A wetting step entirely identical to the wetting step A and to its variants described above can also be performed after this grinding step D. The wetting step A must precede a hydraulic separation as closely as possible.

Next, an intense cleaning step E is performed for the materials which float 48 such as ABS. This operation, which allows the ABSs to regain their native surface, is identical to the operation E described above, with the use of one or more washing apparatuses 54 and a cleaning medium of identical composition.

At the outlet of the cleaning apparatus, polymer materials are rinsed with water and are drained during step F, for example in the extraction screw 56. The water recovered can be re-injected into the washing apparatus 54.

Next, a fourth density separation step by flotation $G_a$ is performed in a separator 57. This is performed in a liquid medium with a density of about 1.07 g/cm$^3$. The liquid medium has an identical composition to the composition described for the medium in the separator 46 of step V, except that the amount of clays per unit volume is greater. The material which floats 58 (wood and other wastes) is removed. At this density, ABS 48 sinks. This sorting makes it possible to improve the selection already made during the second separation by flotation W in the third part of the plant 1. The surfaces of the polymer materials are cleaned during step E, which makes it possible to float the materials 58, which had artifacts that gave them false densities of greater than 1.07 g/cm$^3$ prior to the cleaning.

A rinsing operation Y is performed by spraying the polymers in the transport screw 59 in order to remove any clay. Dripping and centrifugation H of the supernatant polymer material ABS is performed in a centrifuge 61 in order to remove the remaining liquid.

A continuous drying 1 is then performed using the same apparatus 62 or using apparatuses different from the dryer described for polyolefins.

The resulting material is stored J in a buffer silo 63.

An optional air-flow separation step K may be performed at this stage. This step must be placed after a drying step 1. The separator 64 allows the removal of all light materials 66, such as the dusts remaining adhered, small fibres, and foams, as well as the remaining fine particles of wood.

A mechanical density sorting step L allows the separation of the polymer materials to be improved. It is preferably performed in a mechanical device 67 such as a densimetric shaking table, described above, on which the circulating charge 68 is rejected. All the remaining circulating light materials 68, wood, foams, rubber and impurities are removed. PP filled to 30% with talc is also removed by this device.

This last interference product 69 can also be removed by adding an optional step Z of electrostatic sorting with electrostatic sorting table 71, for example from the Hamos Recycling Technique Company (Germany).

The ABS 72 obtained after step L and/or step Z can be sold directly.

Figure 5:
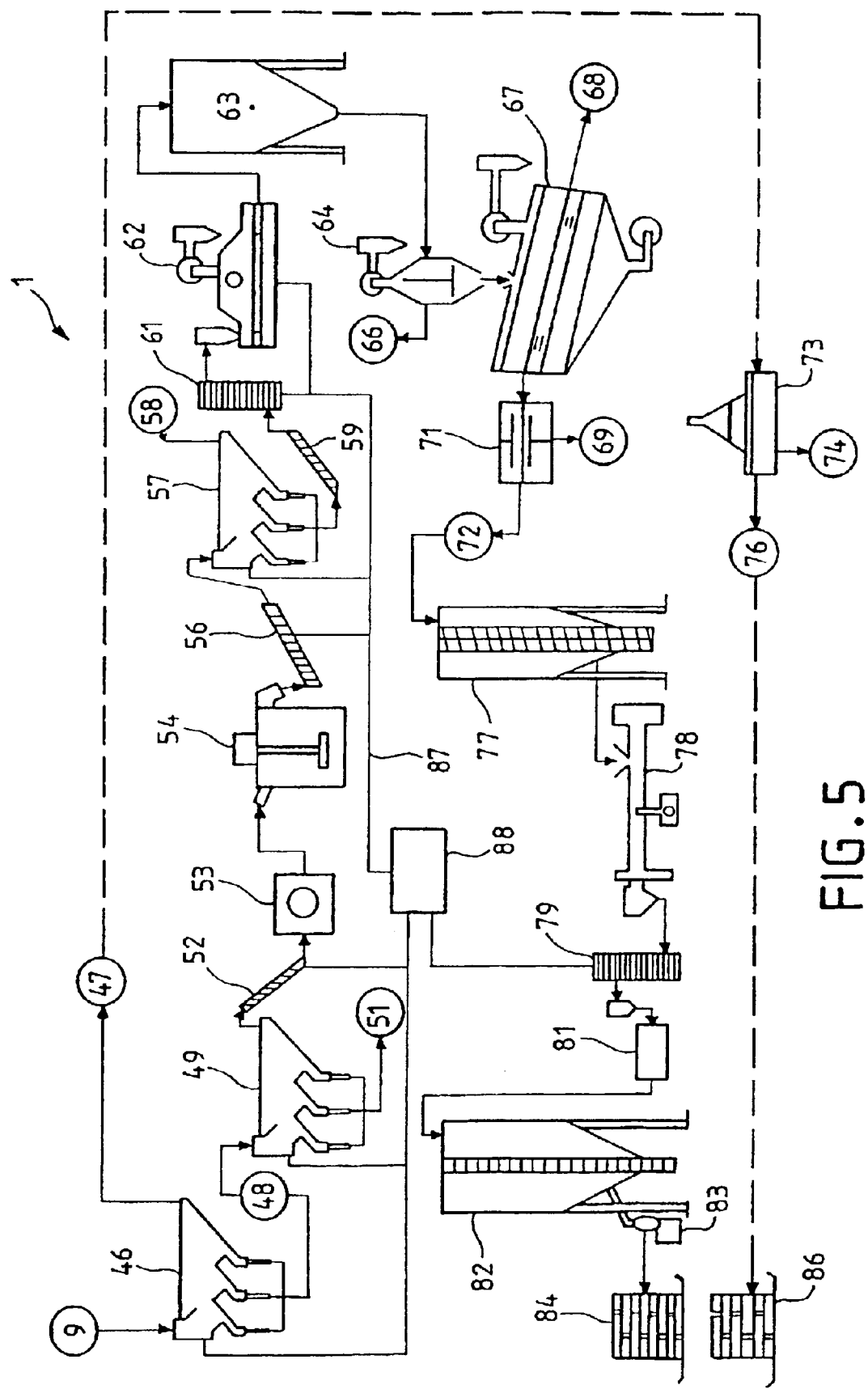
FIG. 5 shows a third part of the plant carrying out the method of the invention, more particularly intended to separate polymer materials with a density of greater than 1 $g/cm^3$.

FIG. 5 represents only the plant required to treat ABS material 48. However, during the above step V, PS 47 was recovered in the floating material, and the process for purifying it will now be described.

The PS 47 is treated in more or less the same way as described above, according to the same steps X, D, E, F, G, Y and H to L carried out using the same devices (represented with dashed lines in FIG. 5). Only the density separation step W and its corresponding device 49 is omitted. A second line of devices 52, 53, 54, 56, 57, 59, 61, 62, 63, 64 and 67 can be mounted in parallel with the first, or these steps can be carried out in batches and alternatively stored ABS 48 or PS 47 polymer materials. This last solution is advantageous if there is a large difference in the entry rate of polymer materials between ABS 48 and PS 47.

Thus, after grinding D, after cleaning E and dripping F, a step $G_b$ of density separation with flotation in a liquid medium is performed in order to refine the purification of PS 47. The density is more or less equal to 1.05 g/cm$^3$, which is identical to the density of the flotation step V. Materials such as wood, mixed products with metals, etc., and any products having a density modified by the cleaning E sink in $58_a$, are removed. PS is rinsed in step Y in the transport screw 59, to remove all the clay, and is then dripped.

Steps H to L are identical to those described above. PS exiting still contains polyolefins charged to a maximum of 20% with density between 1 g/cm$^3$ and 1.05 g/cm$^3$. Usually, filled PE and PP are black. In contrast, PS is white, especially when it is obtained from wastes of household appliances. An optical sorting step $Z_a$ is thus performed in a bench 73, coming, for example, from the Sortex Company, in order to remove these filled polymer materials 74. This separation $Z_a$ can optionally be achieved by electrostatic sorting.

The PS 76 obtained after step L and/or step $Z_a$ can be sold directly.

In certain specific cases, certain steps of the second or of the third part of the plant 1 described above are not essential. For example, step D for finer grinding may not be required. The process can be stopped at step J of storage in silo 63. It should be noted that steps Z and $Z_a$ can be placed directly after the drying step I when the wastes are free of light products; if the steps J to L are omitted, I is followed by Z or $Z_a$, according to the arrow 40.

The hydraulic separators 7, 14, 27, 46, 49, 57 used are so-called static separators. They can be replaced with so-called dynamic hydraulic separators or those comprising a pump and a cyclone in order to produce a circulating sorting flow. All the hydraulic floating separators 7, 14, 27, 46, 49 and 57 can be replaced by shaking separation tables 24, 67, but the materials introduced therein must be dry. All the hydraulic flotation separators 7, 14, 27, 46, 49, 57 can also be replaced with electrostatic separators, for example from the Hamos Recycling Technique Company (Germany). The purification of the PE-PP and PS-ABS fractions can also be achieved or refined by means of a cryogenic grinding operation giving particles of different sizes depending on the polymer material. All the possibilities of use for the devices mentioned above in order to achieve a separation according to a mechanical or chemical property of polymer materials are possible.

The ABS 72 and the PS 76 can undergo further treatment steps P to U, in order to further improve their degree of purity and their mechanical properties. In a similar manner to that for the polyolefins separated in the second part of the plant, an extrusion is performed, which makes it possible to give the polymer materials thus treated physical properties almost identical to those of the native polymer materials.

At this stage, FIG. 5 represents only the plant required to further treat an ABS material 72, it being understood that the other material PS 76 is treated in the same way, by following the same steps from P to U carried out with the same devices (represented with dashed lines in FIG. 5).

ABS 72 and PS 76 phases are thus separately homogenized P by circulation in a silo 77. They are extruded Q in an extruder 78 with filtration from 20 to 300 µm. An air-flow separation step can optionally be placed between the storage P and the extrusion Q, in order to remove fibres and dusts (not represented). The advantage of all the above rinsing steps inserted to avoid the introduction of clay into the extruder 78 can be appreciated. ABS and PS phases are then separately centrifuged R in a centrifuge 79. The phases exiting in the form of pellets are graded S in a grader 81 for removal of fines and aggregates. They are re-homogenized T in a silo 82. In the final step U, they are placed in bags of about 50 1 in a bagging machine 83.

ABS 84 and PS 86 exit as finished products of excellent quality, and can be used in the usual applications of these styrenes.

All of the devices intended for carrying out the common steps D to L, and P to U, in the second and in the third part of the plant 1 can be provided just once, the method then being carried out in batches, or they can be provided several times, for example two of each device respectively in the second and in the third part of the plant. Thus, the separation optimization parameters of these apparatuses will change (density, extrusion temperatures, etc.).

Results

Table 1 gives an evaluation of the percentages of various products, of PP 28 and of PE 29 recovered with the method and the plant 1, from 100% of motor vehicle grinding residues (MVGR).

TABLE 1

| Products obtained | % recovery |
|---|---|
| Foams and light fractions | 19 |
| Foams and heavy fractions | 2 |
| Polymers with d > 1 g/cm³ | 64 |
| PP-PE mixture with d < 1 g/cm³ | 15 |
| | (100%) |
| PP | 67 |
| PE | 33 |

Table 2 gives mechanical properties of native PE and of PE 29, 44 recovered with the method and the corresponding plant 1, from motor vehicle grinding residues.

TABLE 2

| Characteristics | Units | Native | MVGR |
|---|---|---|---|
| Melt index MFI 2.16 kg/230° C. | g/10 min. | 1.9 | 1.7 |
| Density | | 0.925 | 0.928 |
| Strength at the flow threshold 25 mm/s | MPa | 22 | 20.3 |
| Tensile strength | MPa | 18 | 15 |
| Modulus of Elasticity | MPa | 700 | 650 |
| Notched IZOD impact +23° C. | J/m | 160 | 148 |
| Notched IZOD impact −18° C. | J/m | 60 | 56 |

Table 3 gives mechanical properties of native PP and of PP 28, 43 recovered with the method and the corresponding plant 1, from motor vehicle grinding residues.

TABLE 3

| Characteristics | Units | Native | MVGR |
|---|---|---|---|
| Melt index MFI 2.16 kg/230° C. | g/10 min. | 4.1 | 4 |
| Density | | 0.90 | 0.901 |
| Strength at the flow threshold 25 mm/s | MPa | 29 | 22.5 |
| Tensile strength | MPa | 30 | 20 |
| Elongation at break | % | 500 | 304 |
| Modulus of Elasticity | MPa | 1200 | 1000 |
| Notched IZOD impact +23° C. | J/m | 100 | 170 |
| Notched IZOD impact −18° C. | J/m | 45 | 55 |

In the case of motor vehicle grinding residues, the values obtained are the result of a study achieved on test pieces injected directly after sorting PE 28 and PP 29 (step M).

It is seen from these two tables that the quality, and thus the commercial value of the PE and of the PP is more or less equivalent to the quality of first-melt PE and PP.

This is likewise the case for the styrene materials ABS and PS.

Taking into account the solvents which may be used, the plant satisfies the flameproof standards and the various items of apparatus are as leakproof as possible. Throughout the industrial plant described above the washing and rinsing waters, the waters recovered after dripping and centrifugation, the condensation waters from the dryers and the waters in the flotation media either return to the device using them or are collected by a pipe 87 in order to be stored and retreated in a purification plant 88.

The invention is not limited by the details of the embodiments and the examples chosen to illustrate it. Modifications may be made without, however, departing from the scope of the invention. For example, the polymer materials can also come from household waste or industrial waste. The densities of the liquids used in the flotation separation devices can be modified according to the nature of the polymer materials which it is desired to recover and separate.

What is claimed is:

1. A method for treating waste materials to separate polymer materials from other materials contained in the waste materials, the method comprising:

(a) grinding the waste materials, (b) treating the ground waste materials by a first density separation to separate first treated waste materials having a density less than a first density from second treated waste materials having a density greater than the first density, (c) treating the first treated waste materials by mechanical separation to separate third treated waste materials having a selected form factor from fourth treated waste materials which do not have the selected form factor, (d) grinding the third treated waste materials, (e) cleaning the ground third treated waste materials, and (f) treating the cleaned, ground third treated waste materials by a second density separation to separate fifth treated waste materials having a density less than a second density from sixth waste materials having a density greater than the second density, wherein the fifth treated waste materials comprise polymer materials.

2. The method according to claim 1, wherein the step of mechanical separation is performed in a screening device comprising a rotating drum with a calibrated grid.

3. The method according to claim 1, wherein the step of cleaning the third treated waste materials comprises:

(f) providing at least one tank containing a liquid cleaning medium;

(g) placing the third treated waste materials in the tank such that the tank contains from about 50% to about 70% polymer materials and from about 30% to about 50% liquid medium by volume; and (h) stirring the contents of the tank.

4. The method according to claim 3, wherein the step of cleaning the third treated waste materials further comprises:

(i) heating the third treated waste materials and the liquid cleaning medium in the tank to a temperature between room temperature and the boiling temperature of the liquid medium.

5. The method according to claim 3, wherein the liquid medium comprises from about 50% to about 100% by weight of water, from about 0% to about 20% by weight of cleaning agent, from about 0% to about 30% by weight of an abrasive agent, and from abut 0% to about 5% by weight of a wetting agent.

6. The method according to claim 5, wherein the cleaning agent is selected from the group consisting of sodium hydroxide, potassium hydroxide, sodium carbonate, soap and mixtures thereof.

7. The method according to claim 5, wherein the abrasive agent is selected from the group consisting of calcium carbonate powder, talc, silica, alumina, and mixtures thereof.

8. The method according to claim 1, wherein the first and second density separations are performed in a liquid medium having a controlled density such that material having a density less than that of the liquid medium is separated from material having a density greater than that of the liquid medium.

9. The method according to claim 8, wherein the first treated waste materials have a density of less than or equal to 1 g/cm$^3$ and the second treated waste materials have a density of greater than 1 g/cm$^3$.

10. The method according to claim 9, wherein the fifth treated waste materials have a density of less than or equal to 1 g/cm$^3$ and the sixth treated waste materials have a density of greater than 1 g/cm$^3$.

11. The method according to claim 10, wherein the liquid medium comprises water.

12. The method according to claim 10, further comprising the step of:

(g) treating the fifth treated waste materials by a third density separation in a liquid medium having a controlled density to separate seventh treated waste materials having a density less than a third density from eighth treated materials having a density greater than the third density.

13. The method according to claim 12, wherein the density of the liquid medium of the third density separation is adjusted to about 0.90 g/cm$^3$ to about 0.92 g/cm$^3$ in order to separate propylene polymers having a density of less than about 0.90 g/cm$^3$ from ethylene polymers having a density greater than about 0.92 g/cm$^3$.

14. The method according to claim 8, wherein the liquid medium comprises water, wetting agents and at least one of clays and salts such that the density of the liquid medium is greater than about 1 g/cm$^3$.

15. The method according to claim 8, wherein the liquid medium comprises water and at least one of methanol, ethanol and a wetting agent, such that the density of the liquid medium is less than 1 g/cm$^3$.

16. The method according to claim 1, further comprising the step of wetting the first treated waste materials with an alkaline solution before the step of treating the ground waste by mechanical separation.

17. The method according to claim 1, further comprising:

(h) removing liquid from the fifth treated waste materials using a centrifuge, (i) drying the centrifuged fifth treated waste materials, and (j) storing the dried fifth treated waste materials in silos.

18. The method according to claim 1, further comprising:

(h) removing liquid from the fifth treated waste materials using a centrifuge, (i) drying the centrifuged fifth treated waste materials, (j) providing air flow through the dried fifth treated waste materials to remove light materials from the dried fifth treated waste materials, and (k) after step (j), storing the dried fifth treated waste materials in at least one silo.

19. The method according to claim 1, further comprising:

(h) removing liquid from the fifth treated waste materials using a centrifuge, (i) drying the centrifuged fifth treated waste materials and providing air flow through the dried fifth treated waste materials to remove light materials from the fifth treated waste materials, (j) after step (i), treating the dried fifth treated waste materials by a third density separation using a mechanical density separation device to separate seventh treated waste materials having a density less than a third density from eighth treated waste materials having a density greater than the third density, and (k) storing the seventh treated waste materials and the eighth treated waste materials in silos.

20. The method according to claim 1, further comprising (g) removing liquid from the fifth treated waste materials using a centrifuge;

(h) drying the centrifuged fifth treated waste materials;

(i) homogenizing polymer materials contained in the fifth treated waste materials in a first homogenizing step;

(j) extruding the homogenized polymer materials into pellets;

(k) separating water from the polymer pellets using a centrifuge;

(l) grading the polymer pellets based upon size;

(m) homogenizing the graded polymer pellets in a second homogenizing step; and (n) bagging the polymer pellets.

21. A method for treating waste materials to separate polymer materials from other materials contained in the waste materials, comprising the following steps:

(a) grinding the waste materials, (b) treating the ground waste materials by a first density separation to separate first treated waste materials having a density greater than a first density from second treated waste materials having a density less than the first density, (c) treating the first treated waste materials by mechanical separation to separate third treated waste materials having a selected form factor from fourth treated waste materials which do not have the selected form factor, (d) grinding the third treated waste materials, (e) cleaning the ground third treated waste materials, and (f) treating the cleaned, ground third treated waste materials by a second density separation to separate fifth treated waste materials having a density less than a second density from sixth treated waste materials having a density greater than the second density, wherein the fifth treated waste materials comprise PS and the sixth treated waste materials comprise ABS.

22. The method according to claim 21, wherein the step of mechanical separation is performed in a screening device comprising a rotating drum with a calibrated grid.

23. The method according to claim 21, wherein the step of cleaning the third treated waste materials comprises:

(g) providing at least one tank containing a liquid cleaning medium;

(h) placing the third treated waste materials in the tank such that the tank contains from about 50% to about 70% by volume third treated waste materials and from about 30% to about 50% by volume liquid cleaning medium; and (i) stirring the contents of the tank.

24. The method according to claim 23, wherein the step of cleaning the third treated waste materials further comprises:

(j) heating the third treated waste materials and the liquid cleaning medium to a temperature between room temperature and the boiling point of the liquid medium.

25. The method according to claim 23, wherein the liquid cleaning medium comprises from about 50% to about 100% by weight of water, from about 0% to about 20% by weight of cleaning agent, from about 0% to about 30% by weight of an abrasive agent, and from abut 0% to about 5% by weight of a wetting agent.

26. The method according to claim 25, wherein the cleaning agent is selected from the group consisting of sodium hydroxide, potassium hydroxide, sodium carbonate, soap and mixtures thereof.

27. The method according to claim 25, wherein the abrasive agent is selected from the group consisting of calcium carbonate powder, talc, silica, alumina, and mixtures thereof.

28. The method according to claim 21, wherein the first and second density separations are performed in a liquid medium having a controlled density such that material having a density less than that of the liquid medium is separated from material having a density greater than that of the liquid medium.

29. The method according to claim 28, wherein the first selected density is about 1 g/cm$^3$, and the second selected density is about 1.05 g/cm$^3$.

30. The method of claim 29, further comprising:

(g) treating the sixth treated waste materials by a third density separation using a mechanical density separation device to separate seventh treated waste materials having a density less than a third density from eighth treated waste materials having a density greater than the third density, wherein the eighth treated waste materials comprise ABS.

31. The method of claim 30, wherein the mechanical density separation device is a densimetric shaking table.

32. The method of claim 31, further treating the eighth treated waste materials by electrostatic sorting to remove impurities from the ABS in the eighth treated waste materials.

33. The method according to claim 29, further comprising:

(g) treating the sixth treated waste materials by a third density separation in a liquid medium having a controlled density to separate seventh treated waste materials having a density of less than about 1.1 g/cm$^3$ from eighth treated waste materials having a density greater than about 1.1 g/cm$^3$; and (h) treating the seventh treated waste materials by a fourth density separation in a liquid medium having a controlled density to separate ninth treated waste materials having a density less than 1.07 g/cm$^3$ from tenth treated waste materials having a density greater than 1.07 g/cm$^3$, wherein the tenth treated waste materials comprise ABS.

34. The method of claim 33, further comprising:

(g) treating the tenth treated waste materials by a fifth density separation using a mechanical density separation device to separate eleventh treated waste materials having a density less than a third density from twelfth treated waste materials having a density greater than the third density, wherein the twelfth treated waste materials comprise ABS.

35. The method of claim 34, wherein the mechanical density separation device is a densimetric shaking table.

36. The method of claim 35, further treating the twelfth treated waste materials by electrostatic sorting to remove impurities from the ABS in the twelfth treated waste materials.

37. The method of claim 21, further comprising:

(g) treating the fifth treated waste materials by a third density separation using a mechanical density separation device to separate sixth treated waste materials having a density less than a third density from seventh treated waste materials having a density greater than the third density, wherein the seventh treated waste materials comprise PS.

38. The method of claim 37, wherein the mechanical density separation device is a densimetric shaking table.

39. The method of claim 38, further comprising treating the seventh treated waste materials by optical sorting to remove filled PE and filled PP from the PS in the eighth treated waste materials.

40. The method according to claim 21, further comprising:

(g) treating the fifth treated waste materials by a third density separation in a liquid medium with a controlled density to separate sixth treated waste materials having a density less than about 1.05 g/cm$^3$ from seventh treated waste materials having a density greater than about 1.05 g/cm$^3$, wherein the sixth treated waste materials comprise PS.

41. The method of claim 40, wherein the mechanical density separation device is a densimetric shaking table.

42. The method of claim 41, further treating the sixth treated waste materials by optical sorting to remove filled PE and filled PP from the PS in the sixth treated waste materials.

* * * * *